United States Patent [19]

Germain

[11] Patent Number: 5,573,207
[45] Date of Patent: Nov. 12, 1996

[54] VALVE APPARATUS FOR RAM-AIR WINGS

[76] Inventor: Brian S. Germain, 4804 6th St., Zephyrhills, Fla. 33541

[21] Appl. No.: 617,471
[22] Filed: Mar. 15, 1996

Related U.S. Application Data

[63] Continuation-in-part of Ser. No. 401,774, Mar. 10, 1995.
[51] Int. Cl.⁶ .................................................. B64D 17/04
[52] U.S. Cl. .......................... 244/145; 244/152; 244/142
[58] Field of Search .................................. 244/145, 152, 244/142, 102

[56] References Cited

U.S. PATENT DOCUMENTS

| | | | |
|---|---|---|---|
| 3,749,337 | 7/1973 | Jalbert | 244/145 |
| 4,191,349 | 3/1980 | Pravaz | 244/145 |
| 4,930,728 | 6/1990 | Wittington | 244/145 |
| 5,169,092 | 12/1992 | Murakami | 244/145 |
| 5,201,482 | 4/1993 | Ream | 244/145 |
| 5,303,883 | 4/1994 | Brewer | 244/145 |
| 5,368,259 | 11/1994 | Tabor | 244/145 |

FOREIGN PATENT DOCUMENTS

8808685 12/1989 France .......................................... 17/2

Primary Examiner—Christopher P. Ellis
Attorney, Agent, or Firm—C. Douglas McDonald, Jr. & Associates, P.A.

[57] ABSTRACT

This invention describes a ram-air type inflatable wing that is resistant to deflation. The inflatable air wing includes a plurality of cells disposed between the top and bottom skins of the wing, with at least one valve positioned within each of a plurality of cells. Each valve generally inhibits deflation of the cells when the air pressure inside the cells is greater than the air pressure outside the cells and permits the cells to inflate when the air pressure outside the cell is greater than the air pressure inside the cells.

32 Claims, 8 Drawing Sheets

VALVE APPARATUS FOR RAM-AIR WINGS

RELATED APPLICATIONS

This application is a continuation-in-part of application Ser. No. 08/401,774 filed on Mar. 10, 1995 entitled Valve Apparatus for Ram-Air Parachutes and Paragliders and Method for Making Same and filed in the name of Brian S. Germain.

BACKGROUND OF THE INVENTION

This invention relates generally to parachutes and paragliders. More particularly, it relates to ram-air type parachutes and paragliders that include a plurality of cells with at least one valve in at least one of the cells to inhibit deformation of the air wing structure.

When an individual parachutes or paraglides, safety is a primary concern. With the ram-air type parachutes and paragliders in which there are a plurality of cells, it is important to maintain the airfoil shape during all flying conditions. This becomes increasingly important during adverse flying conditions. In conventional ram-air type inflatable air wings, during flight the individual cells inflate due to the existence of greater air pressure outside each cell compared to that inside the cells. This is partly due to the positioning of an air scoop at the opening of each such cell and closing the respective opposing end. However, conditions or circumstances may arise such as, for example, air turbulence or changes in air velocity, that cause air to exit the cells, thereby deforming and possibly collapsing the air wing.

In order to reduce the danger associated with deformation or collapse of the air wing, it is desirable to provide a ram-air wing having cells that are resistant to deflation and inhibit deformation of the ram-air wing. It is also desirable to provide an air wing that maintains its airfoil shape with an air scoop during changes in air velocity as well as to provide increased lift at relatively low air velocities. In addition, it is also desirable to provide an air wing that maintains the structural integrity of the inflated air wing during changes in directional headings and maneuvers with the air wing. It is still further desired to provide a relatively inexpensive, yet reliable, air wing design that provides a user a greater degree of control and safety over his or her intended flight path.

SUMMARY OF THE INVENTION

In view of the foregoing, the apparatus of this invention provides an inflatable ram-air wing resistant to the undesirable deformation that may be caused due to air turbulence, maneuvers, changes in air velocity as well as other circumstances that tend to cause deflation or deformation of the inflated ram-air wing. Therefore, the apparatus of the present invention provides a ram-air inflatable wing that includes a top skin, a bottom skin, and a plurality of elongated ribs. The top skin and the bottom skin each have a front edge, a rear edge, and a pair of generally opposed lateral edges. Each of the plurality of elongated ribs has an upper edge, a lower edge and a front edge with at least a portion of the upper edge being affixed to the top skin and at least a portion of the lower edge affixed to the bottom skin. In addition, each pair of adjacent ribs are spaced apart at a predetermined distance. The ram-air inflatable wing also includes a plurality of elongated cells, each cell defined by the top skin, the top skin, and a pair of adjacent ribs, with each cell having an inlet defined by the front edge of the top skin, the front edge of the bottom skin and the front edge of a pair of adjacent ribs. At least one first valve is positioned within at least one of the plurality of cells, each first valve includes a panel of flexible material having a bottom edge, a top edge, and a pair of generally opposed side edges. The bottom edge of the panel is positioned adjacent the bottom skin and the top edge of the panel is positioned adjacent the top skin. The generally opposed side edges are spaced apart one from another a distance generally equal to the distance between the adjacent ribs with at least a portion of each of the pair of side edges being affixed to a respective one of the pair of adjacent ribs. At least one of the top edge and the bottom edge are moveable such that the moveable edge of the panel may be urged into generally sealing engagement with the respective adjacent skin at a point substantially rearwardly of the front edge of the adjacent skin when the air pressure inside the cell is greater than the air pressure outside the cell and may be urged away from the respective adjacent skin when the air pressure outside the cell is greater than the air pressure inside the cell, whereby each cell having a valve remains substantially inflated when the air pressure inside the cell is greater than the air pressure outside the cell inhibiting deformation of the air wing. The air wing also includes a chamber having a volume defined by the first valve, a pair of adjacent ribs forward of the valve, the top skin positioned between the pair of adjacent ribs forward of the engagement point and the inlet, such that a substantial part of the volume is maintained when the moveable edge engages the respective adjacent skin.

BRIEF DESCRIPTION OF THE DRAWINGS

A preferred embodiment of the present invention is illustrated in the drawings in which.

DETAILED DESCRIPTION OF PREFERRED EMBODIMENTS

Figure 1:
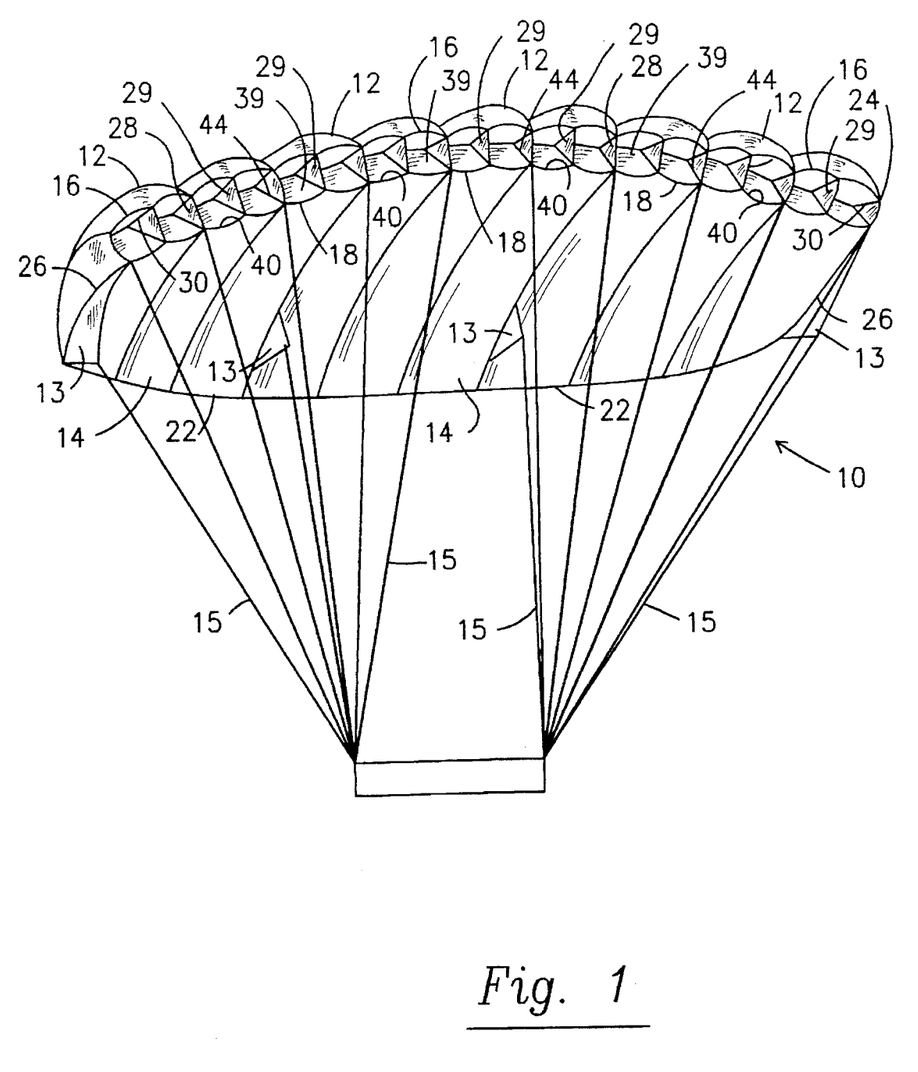
FIG. 1 is a front perspective view of a ram-air inflatable wing in which a valve is positioned within each cell in accordance with the present invention.

A preferred embodiment of the ram-air inflatable wing of this invention is illustrated in the context of a parachute canopy in the front perspective view of FIG. 1. The ram-air inflatable wing of the present invention, generally indicated as 10, includes a top skin 12 and a bottom skin 14 of a flexible, light weight material, which may suitably be a zero permeability rip stop nylon. As shown in the combined views of FIGS. 1 and 2, both the top skin 10 and the bottom skin 14 have respective front edges 16 and 18, rear edges 20 and 22, and a pair of generally opposed lateral edges 24 and 26, respectively, extending between the front and rear edges of each respective skin. A plurality of elongated ribs 28, each rib 28 having an upper edge 30, a lower edge 32 and a front edge 36, are positioned between the top skin 12 and bottom skin 14, with at least a portion of lower edge 32 affixed to the bottom skin 14 and at least a portion of upper edge 30 of affixed to the top skin 12. Preferably, each pair of adjacent ribs are spaced apart from each other a predetermined distance, wherein a relative decrease in the distance between adjacent ribs may result in a smoother, more consistent air foil.

The plurality of ribs 28, the respective top skin 12 and the bottom skin 14 define a plurality of cells 34 within the air wing 10, with each cell 34 being further defined by each adjacent pair of ribs 28 and the respective portions of the top skin 12 and the bottom skin 14 extending between that pair of adjacent ribs 28. Consequently, each cell 34 within the air wing 10 has a shape that is defined by the shape and orientation of each pair of adjacent ribs 28 positioned between the top skin 12 and the bottom skin 14. Each cell also includes an inlet 37 defined by the front edge of the top skin 16, the front edge of the bottom skin 18 and the front edges 36 of a pair of adjacent ribs. While the preferred embodiment in FIG. 1 illustrates each of the plurality of ribs 28 being substantially transverse to both the top and bottom skins 12 and 14, respectively, it will be understood that the ribs 28 may be oriented at varying angles between the top and bottom skins 12 and 14, respectively, resulting in cells defined by a substantially transverse pair of adjacent ribs 28 or cells that may be substantially elongated triangles.

Particular attention to the shape of each rib 28 may be had with reference to the various alternative embodiments illustrated FIGS. 2, 3, 4, 8, 9, and 11. As is illustrated in the figures, the front edge 36 of each rib 28 is preferably configured with at least a portion of the front edge 36 being curved. This preferred curved front edge 36 is positioned proximal front edges of both the top and bottom skins 16 and 18, respectively. In addition, it also preferred that the distance between the upper and lower edges 30 and 32, respectively, of the rib 38 is greatest proximal the front edge 36. This creates the forward skewed shape of the cell generally resulting in an inflatable air wing having a forward center of lift, thereby, enhancing the amount of lift at lower air velocities. The distance between the upper and lower edges 30 and 32, respectively, of each rib 28 preferably decreases from its front edge 36 toward the rear edges 20 and 22 generally providing the desired airfoil shape as illustrated in the figures. The material used for the ribs 28 may be a conventional rip stop nylon, such as that used for the top and bottom skins 12 and 14, respectively. The ribs 28 are typically affixed to the respective skins by means of stitching, although adhesives or other conventional fasteners may suffice.

Figure 2:
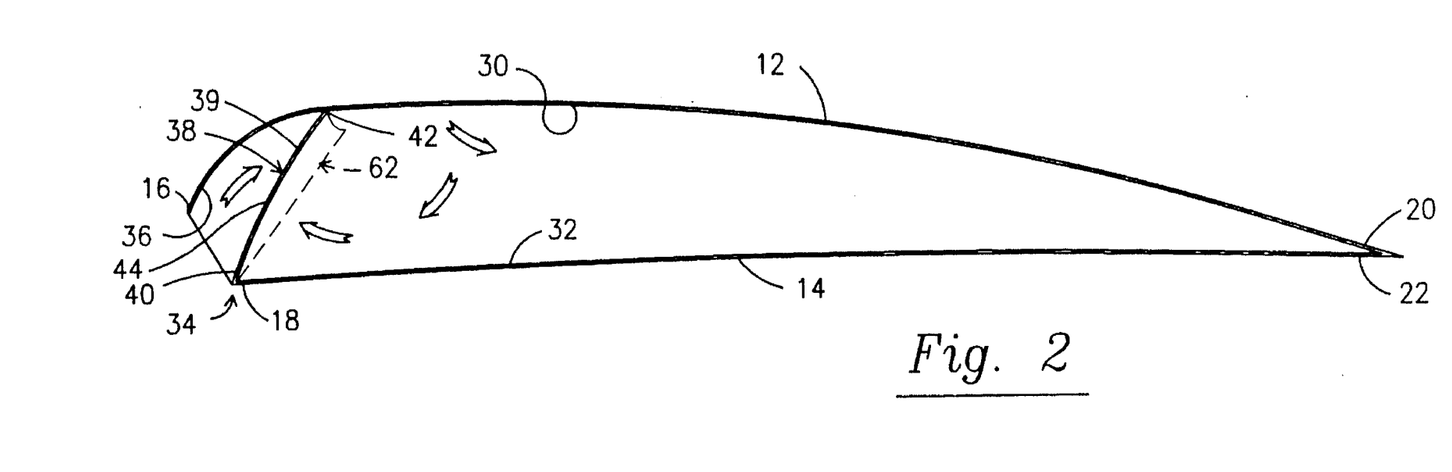
FIG. 2 is a side view of a cell of the view of FIG. 1 having a first valve positioned proximal the front of the cell.

As is also shown in the preferred embodiment in FIG. 2, the front edge 16 of the top skin 12 preferably extends over at least a portion of the curved front edge 36. The top skin is affixed to at least a portion of the curved front edge 36, typically by stitching. Therefore, as perhaps better seen in the front perspective views of FIGS. 1 and 6, the inlet 37 each cell 34 forms an air scoop that serves as the opening into each cell through which the air flows to inflate the cells 34.

In the preferred embodiment illustrated in FIG. 1 there is at least one first non-return valve 38 positioned within at least one, but preferably each, of the plurality of cells 34 that permits the flow of air into but resists the air flow out of each cell. It may also be suitable to position at least one first valve 38 within each pair of adjacent cells 34.

Figures 7, 8:
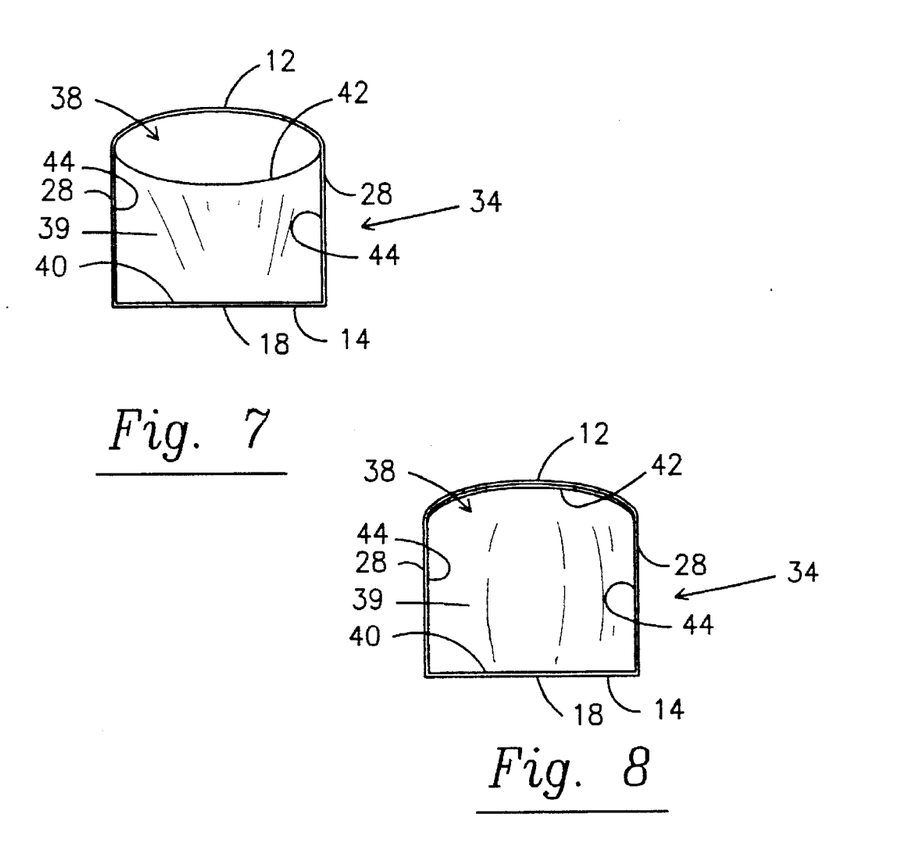
FIG. 7 is a front view of the cell of FIG. 2 illustrating the top edge of the valve panel positioned away from the top skin.
FIG. 8 is a front view of the cell of FIG. 2 illustrating the top edge of the panel positioned proximal the top skin.

As illustrated in the preferred embodiment of FIG. 2, each first valve may include a panel 39 of flexible material, which may suitably be zero permeability rip stop nylon or the like, having a bottom edge 40 positioned adjacent the bottom skin 14 and a top edge 42 positioned adjacent the top skin 12, with at least one of these edges being moveable. The front the view of FIGS. 7 and 8 illustrates that each panel may include a pair of generally opposed side edges 44 that are spaced apart from one another a distance at least generally equal to the distance between the adjacent ribs 28. In addition, at least a portion of each of the pair of side edges 44 is affixed to, such as by stitching, a respective one of the pair of adjacent ribs 28 between the top skin 12 and the bottom skin 14. Preferably, the valve panel 39 is positioned within the cell 34 with its top edge 42 being spaced from the front edge 16 of the top skin 12 such that a leading edge air scoop is maintained at the inlet 19 at substantially all times during use of air wing 10. This structure promotes air to accelerate into the cell 34 between the top skin 10 and the valve 38, thereby enhancing the air foil shape during adverse flying conditions.

Figure 12:
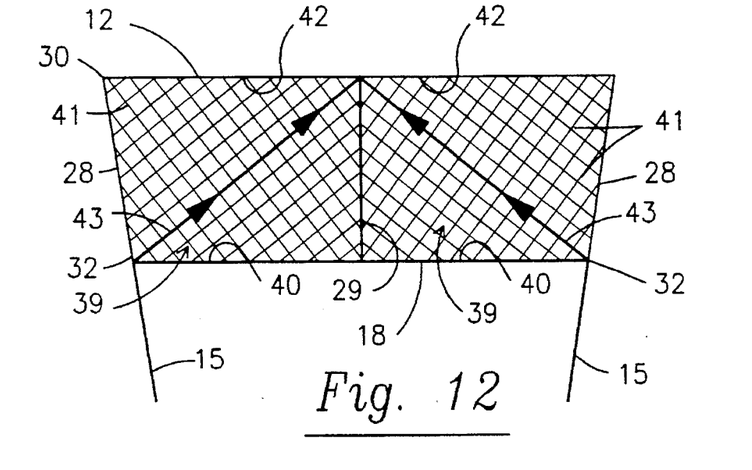
FIG. 12 is a front view of a pair of adjacent cells of FIG. 1 illustrating a preferred orientation of the valve panel weave pattern.

The preferred embodiment of FIG. 1 illustrates two cells 34 positioned between each adjacent pair of suspension lines 15. In addition, certain suspension lines may be attached to stabilizers 13 positioned distal the front end of the air wing 10 and affixed to the lower edge of 30 of a portion of the loaded ribs 28. The rib 29 positioned intermediate each adjacent pair of suspension lines 15 will hereinafter be referred to as the non-loaded rib 29, non-loaded referring to the absence of a suspension line affixed to that rib 29. In the preferred embodiment illustrated in FIG. 1 where two cells are positioned between each adjacent pair of suspension lines 15, it is preferable that each such cell 34 include a valve 38 comprising a panel 39 of flexible material, suitably rip stop nylon, that includes a weave pattern 41. A preferred weave pattern 41 orientation is shown in FIG. 12 of the embodiment illustrated in FIG. 1, with the weave pattern 41 of each panel 39 being biased between the each loaded rib 28 and the respective adjacent non-loaded rib 29 at an appropriate angle, which suitably may be about 45°. Positioning the weave pattern 41 of the panel generally provides a cross-bracing effect, indicated by arrows 43, to the non-loaded rib 29 as well as provides a generally elastic function along the attachment of the panel 39 to the respective ribs 28 and 29 and bottom skin 14. In addition, by spacing apart each adjacent rib such that the weave pattern generally extends parallel to line extending from the bottom edge of a loaded rib 28 to the top edge of a non-loaded rib 29, such cross-bracing effect may be improved.

Figure 13:
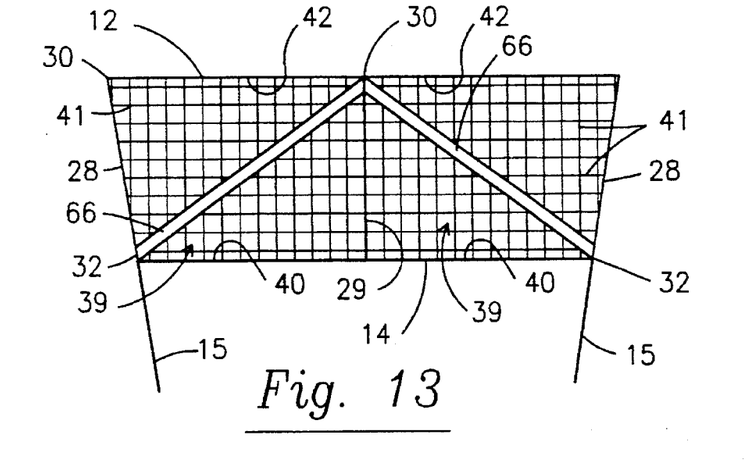
FIG. 13 is an alternative embodiment of the cells of FIG. 12 in accordance with the present invention.

This cross-bracing effect may also be achieved where the weave pattern 41 of the panel 39 is aligned substantially normal to the top edge 42 and the bottom edge 40, as opposed to being positioned on a bias, through affixing in a traditional manner a conventional reinforcing tape 49, suitably rip stop nylon, to the panel 39, shown in FIG. 13. In order to provide a similar cross-bracing effect, the reinforcing tape 49 preferably is positioned generally on a diagonal bias along the panel 39 preferably extending between the top edge 42 and the bottom edge 40 of the flexible material. More specifically the cross-brace is attached to the panel 39 extending from a position proximal an adjacent suspension line 15, such as the lower edge 32 of an adjacent loaded rib 28, to the upper edge of an adjacent non-loaded rib 29. In this manner, the reinforcing tape 49 operates to distribute a portion of the load from the loaded rib 28 to the non-loaded rib 29, generally improving the durability of the air-wing.

In accordance with the present invention, at least one of the top and bottom edges 40 and 42, respectively, of the panel 39 is moveable such that the moveable edge, shown as the top edge 42 in the views of FIGS. 2, 6, 7, and 8, may be urged into sealing engagement with the respective adjacent skin 12 or 14 at a point 47 substantially rearwardly of the front edge 16 or 18 of the respective adjacent skin 12 or 14 when the air pressure inside the cell 34 is greater than the air pressure outside the cell 34, shown in FIG. 8. Furthermore, this moveable edge may also be urged away from the respective adjacent skin 12 or 14 when the air pressure outside the cell 34 is greater than the air pressure inside the cell 34 to allow the flow of air into the cell 34, shown in FIG. 7. It is this engagement between the moveable edge and the respective adjacent skin 12 or 14 that enables each cell 34 to resist deflation when the air pressure inside the cell 34 is greater than that of the air pressure outside the cell 34 and, thereby, inhibit deformation of the air wing 10.

The preferred positioning of the valve as described above and illustrated in the figures forms a chamber 45 at the front of each cell 34 that includes a first valve 38. In general, the chamber is a volume defined by the first valve 38 a pair of adjacent ribs 28 forward the first valve 38, the portion of the top skin positioned between the pair of adjacent ribs 28 forward of the engagement point 47 and the inlet 19. Preferably, the cell 34 is configured such that a substantial part of the volume of the chamber 45 is maintained when the moveable edge engages the respective adjacent skin 12 or 14.

Referring to the embodiment of FIG. 2, it is preferable that the distance between the top edge 42 and the bottom edge 40 of each panel 39 be at least equal to the distance between the top and bottom skins 12 and 14, respectively, at the position in the cell 34 where the panel 39 is positioned. Thus, when the air pressure inside the cell 34 is greater than the air pressure outside the cell 34, at least a portion of the moveable edge of the panel 39, indicated as 42 in FIGS. 2 and 6, engages the respective adjacent skin. It will be understood that an appropriate increase in the distance between the top edge 42 and the bottom edge 40 will generally facilitate the engagement of the moveable edge 42 of the panel 39 with the respective adjacent skin and better resist deflation of the cell 34. Furthermore, by placing valves 38 in each cell 34 or at least a large number of cells, the deformation of the inflated air wing 10 accordingly may be further inhibited and its overall structural rigidity increased.

Figure 6:
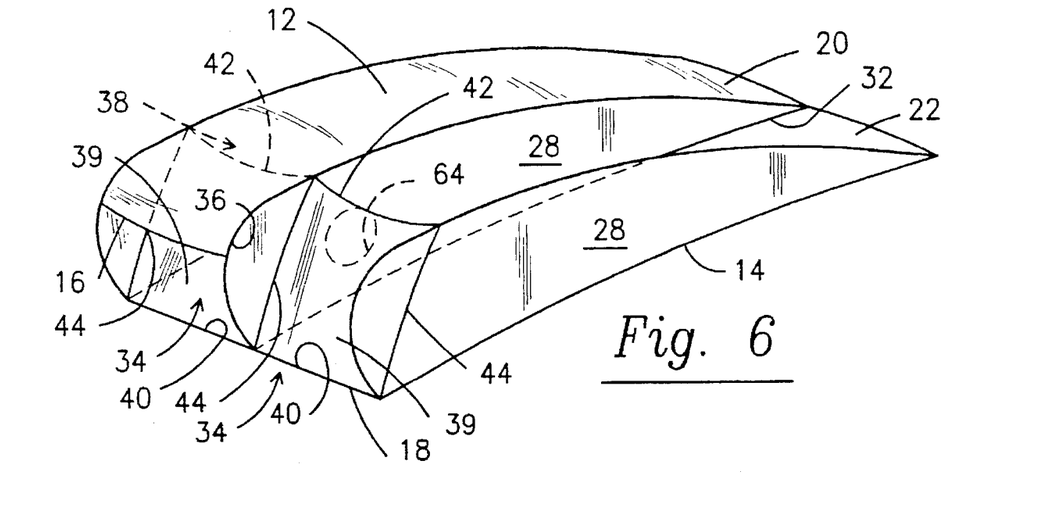
FIG. 6 is a front perspective view of two adjacent cells according to the embodiment of FIG. 2.

As is shown in the views of FIGS. 2 and 6, the bottom edge 40 of the panel 39 is positioned preferably proximal the front edge 18 of the bottom skin 14. The top edge 42 of the panel 39 of the first valve 38 is positioned adjacent the top skin 12 and spaced a predetermined distance from the front edge 16 of the top skin 12 such that the panel 39 is angled rearwardly in the cell 34, thereby retaining the leading edge air scoop. In addition, the moveable edge 42 of the panel 39 is moveable into substantially sealing engagement with the top skin 12 and to a position away from the top skin 12, illustrated as the dotted line 62. The air scoop, which is formed of the front edge 16 of the top skin 12, the front edge 18 of the bottom skin 14, and the front edge of the pair of adjacent ribs 36, cooperates with the first valve 38 to provide non-linear airflow within the cell 34 that further enhances the inflation and, consequently, the rigidity of the cell 34.

Figure 14:
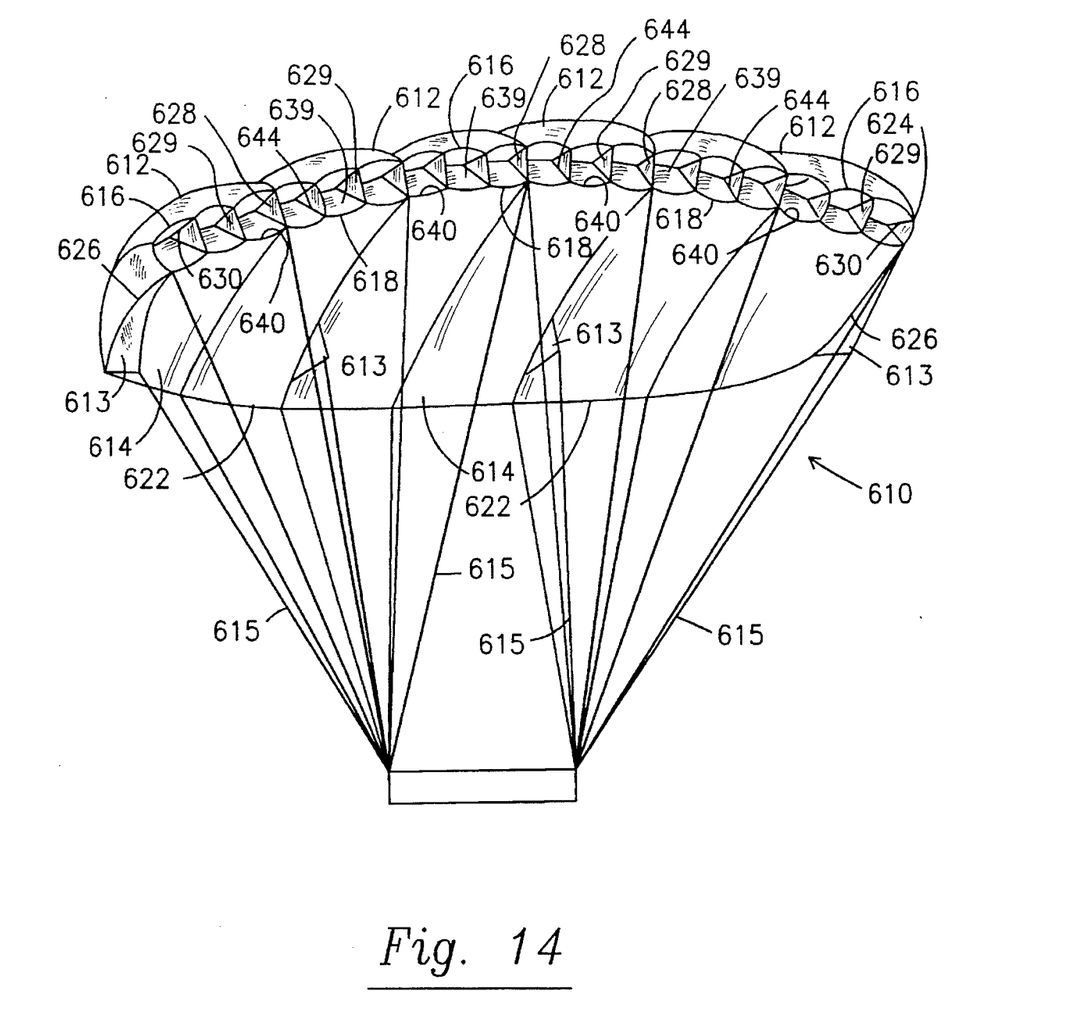
FIG. 14 is a front perspective view of an alternative preferred embodiment of a ram-air inflatable wing in accordance with the present invention.
Figure 15:
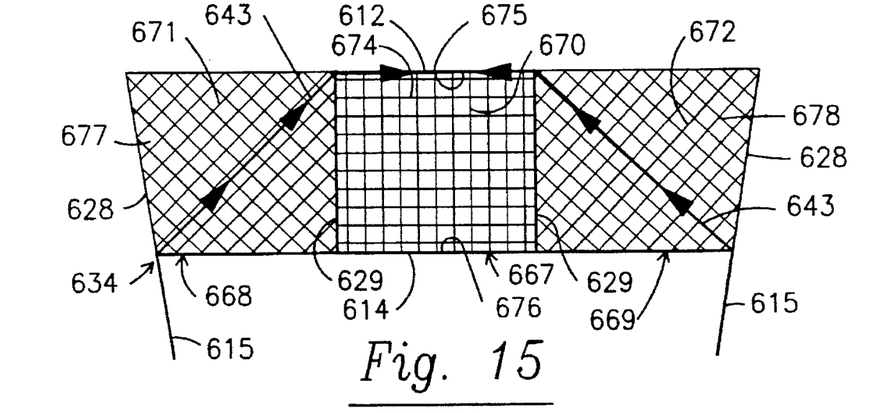
FIG. 15 is a front view of three adjacent cells of the inflatable wing of FIG. 14.

Referring now to FIGS. 14 and 15, an alternative preferred embodiment is illustrated with three adjacent cells, generally indicated as 634, positioned between an adjacent pair of suspension lines 615, including a middle cell 667 and two respective adjacent cells 668 and 669. Reference numbers similar to those used in the prior drawings, increased by a factor of 600, indicate corresponding components. In this preferred embodiment, at least one first valve 638 is positioned within each of these three cells 634. Similarly to the preferred embodiments illustrated in FIGS. 1, 12 and 13 the panels of flexible material 674, 677, and 678 of each of the valves includes a weave pattern, such as found in conventional zero-permeability rip stop nylon. The weave pattern 670 of the middle cell 667 is aligned substantially normal to the top edge 675 and the bottom edge 676 of the middle valve panel 674. In addition, it is preferable that the weave pattern 671 and 672 of each valve panel 677 and 678 of the respective adjacent cells 668 and 669 is aligned on a bias generally between each respective loaded rib 628 and non-loaded rib 629, which may be about a 45° angle. This tri-cell cross-bracing effect, generally indicated by arrows 643, generally improves the air foil shape of the air wing as well as increase the durability of the air wing. It will be understood that while appropriate cross-bracing may effected by orienting the weave pattern of the three cells 634 as just described, it may also be achieved where the weave pattern of each valve panel is aligned substantially normal between the top and bottom skins 612 and 614, respectively, by attaching appropriate reinforcing tape as discussed with respect to FIG. 13. The reinforcing tape may be attached to the valve panels 677 and 678 of the two outside adjacent cells 668 and 669, respectively, with the reinforcing tape positioned generally diagonally on each respective panel extending between the top edge of the non-loaded ribs 629 and the lower edge of each adjacent loaded rib 628. This particular cross-bracing approach is also adaptable to the preferred embodiment described with respect to FIGS. 10 and 11 where a unitary elongated panel forms the valve panel within each cell.

Figure 3:
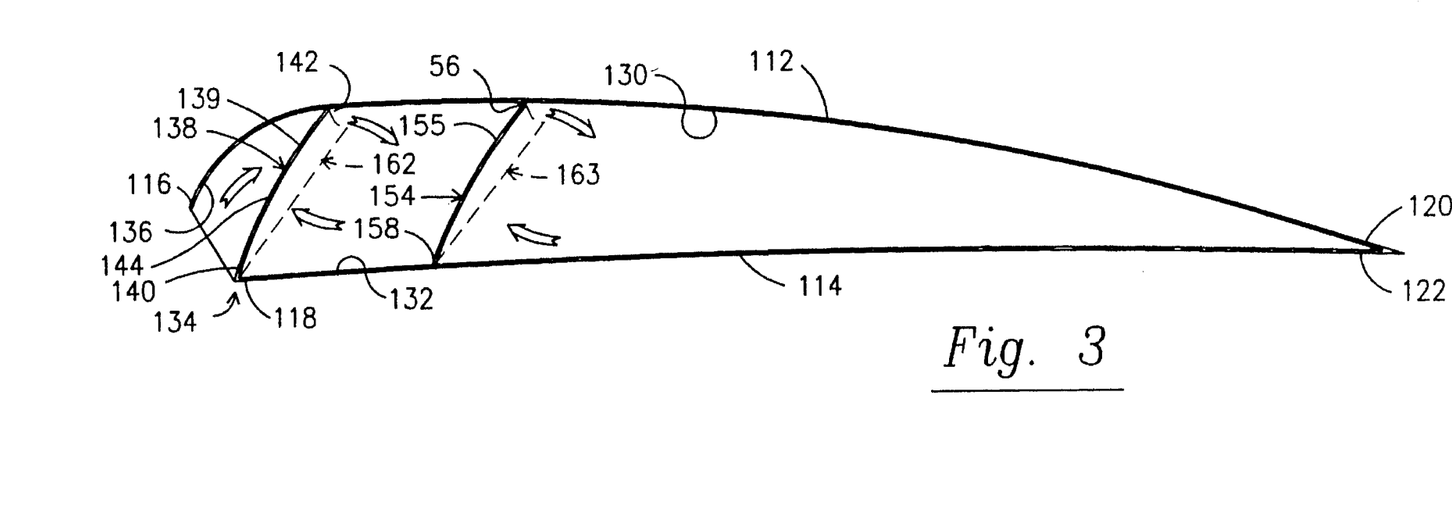
FIG. 3 is a side view of an alternative embodiment of the cell of FIG. 2 illustrating a second valve positioned substantially parallel to the first valve.

An alternative preferred embodiment of the side view of the cell of FIG. 2 is illustrated in FIG. 3, in which each cell 134 comprises a plurality of adjacent valves with a second valve 154 positioned within the cell 134 rearwardly from a first valve 138. For simplicity of illustration, similar reference numbers to that of FIG. 2, increased by a factor of 100, are used to indicate corresponding components of the cell. In addition, while two valves are shown in FIG. 3, it will be understood that the present invention also contemplates a larger number of valves. Each valve 138 and 154 includes a panel of flexible material 139 or 155, respectively, with each panel having a respective top edge 142 or 156 positioned adjacent the top skin 112 and a respective bottom edge 140 or 158 positioned adjacent the bottom skin 114. Each panel 139 and 155 also includes a pair of generally opposed side edges 144 or 160, respectively, spaced apart a distance generally equal to the distance between adjacent ribs of the cell 134 to which they are respectively attached. At least one of the top edges 142 or 156 and one of the bottom edges 140 or 158, respectively, of each panel 139 and 155 are preferably moveable between a position of sealing engagement with the respective adjacent skin and a position away from the respective adjacent skin. The preferred embodiment of FIG. 3 illustrates the bottom edges 140 and 158 of each panel 139 and 155, respectively, affixed to the bottom skin 114 with the top edges 142 and 156 being moveable engagement with the top skin 112, generally indicated as the dotted lines 162 and 163, respectively. As with the other embodiments described herein, the first valve panel 139 in FIG. 3 may be integral with the bottom skin 114. In addition, the top edge 142 of the first valve panel 139 engages the top skin 112 at a point 147 that is substantially rearwardly of the front edge 116 of the top skin 112.

Another desirable characteristic of the present invention is that adjacent pairs of cells further include cross ports 64 in the ribs between the respective adjacent cells 34 and 35 that permit air flow between the adjacent cells 34 and 35. As shown in FIG. 6, these cross ports 64 are preferably positioned proximal and rearward of the valve 38 and at a predetermined position and size in order to maximize the structural rigidity caused by inflating the cells 34. The cross ports 64 also provide means for one cell 34 to help inflate its respective adjacent cells 35.

Figures 4, 5:
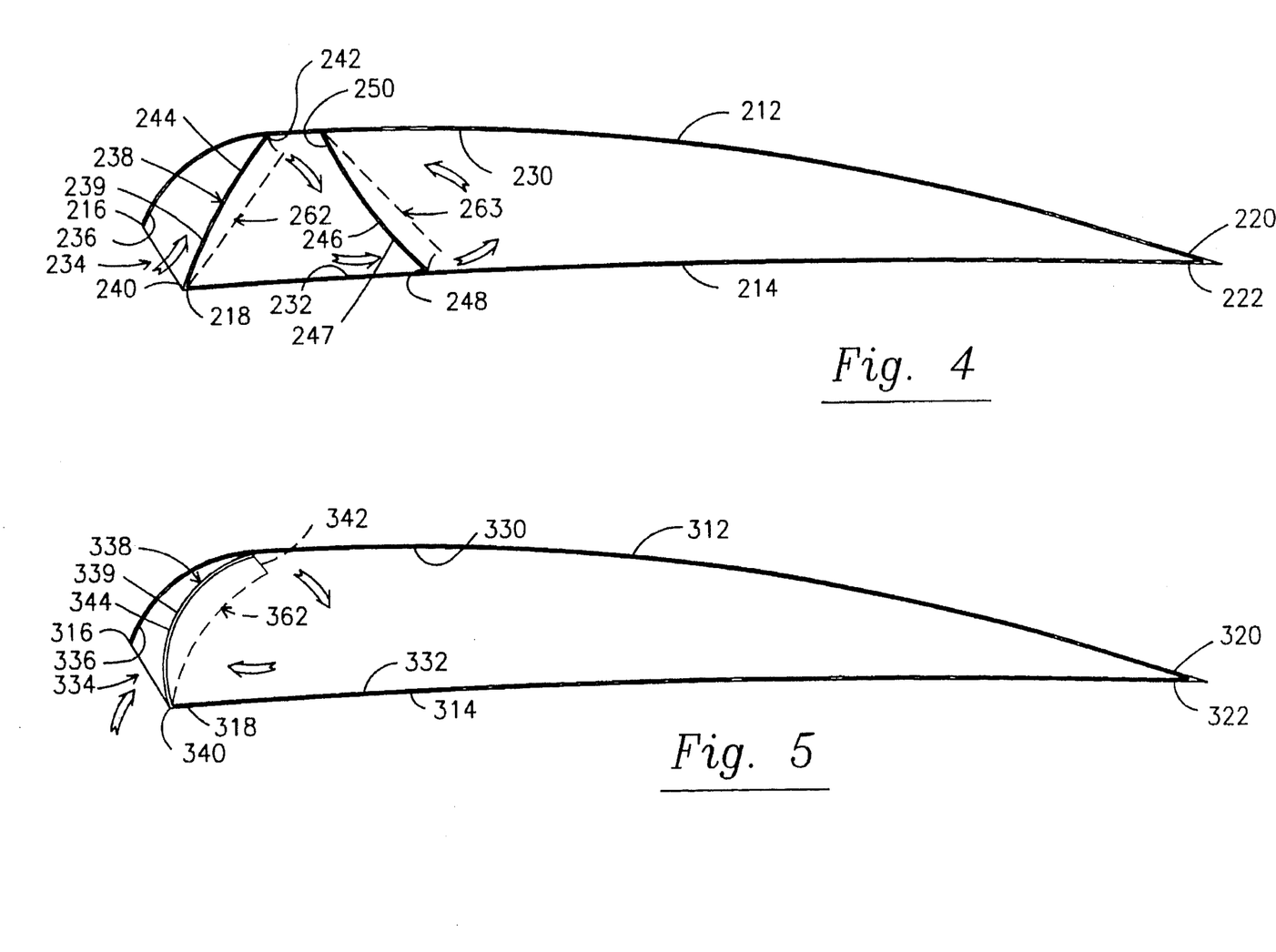
FIG. 4 is a side view of an alternative embodiment of the cell of FIG. 2 illustrating a second valve positioned substantially transverse to the first valve.
FIG. 5 is a side view of an alternative embodiment of the cell of FIG. 2 illustrating a valve panel extending rearwardly in an arcuate manner.

FIG. 4 illustrates another alternative embodiment of the cell of FIG. 2 where a second valve 246 is positioned rearwardly of the first valve 238. The first valve 238 is substantially the same as that described with respect to FIG. 2 and for simplicity of illustration, similar reference numbers increased by a factor of 200 indicate the corresponding component parts as previously described with respect to FIG. 2. Similarly to the first valve 238, the second valve 246 includes a panel of flexible material 247, which may suitably be rip stop nylon or the like, having a top edge 250 affixed to the top skin 212 proximal the top edge 242 of the first valve panel 239, and a bottom edge 248 positioned proximal the bottom skin 214. In addition, the second valve 246 also includes a pair of generally opposed side edges 252 with at least a portion of each pair of side edges 252 of the panel affixed to a respective rib of the pair of adjacent ribs. Unlike the first valve 238, the bottom edge 248 of the second valve panel 247, rather than the top edge, is moveable between a position of sealing engagement with the bottom skin 214 and a position away from the bottom skin 214. In this orientation of valves, the top edge 242 and the bottom edge 248 of the valve panels 239 and 247, respectively, cooperate to restrict the air flow out of the cell 234 when the air pressure inside the cell 234 exceeds that of the air pressure outside the cell 234. In addition, this arrangement of valves 238 and 246 generally provides for an increased non-linear air flow to and within the cell 234 when the air pressure outside the cell 234 is greater than the air pressure inside the cell 234. Furthermore, the first valve 238 may be integral with the bottom skin 214, avoiding additional manufacturing steps.

An alternative embodiment of the cell of FIG. 2 is illustrated in FIG. 5, with similar reference numbers, increased by a factor of 300, indicating corresponding components. In this embodiment at least a portion of the pair of side edges 344 extend in an arcuate manner rearwardly between the bottom edge 340 and the top edge 342 of the panel 339. At least a potion of each of these arcuate side edges 344 is affixed to a respective one of the adjacent ribs of the cell 334, such as by stitching. The bottom edge 340 of the panel 339 is also positioned adjacent and affixed to the front edge 318 of the bottom skin 314. The top edge 342 of the panel illustrated in this embodiment is the moveable edge, generally indicated as 362. It further will be appreciated that the panel 339 of the first valve 338 may be integral with the bottom skin, thereby avoiding the additional stitching between the bottom edge 340 of the panel 339 and the bottom skin 314. The remaining portions of the cell 334 are substantially identical to those described with respect to the embodiment of FIG. 2.

Figure 9:
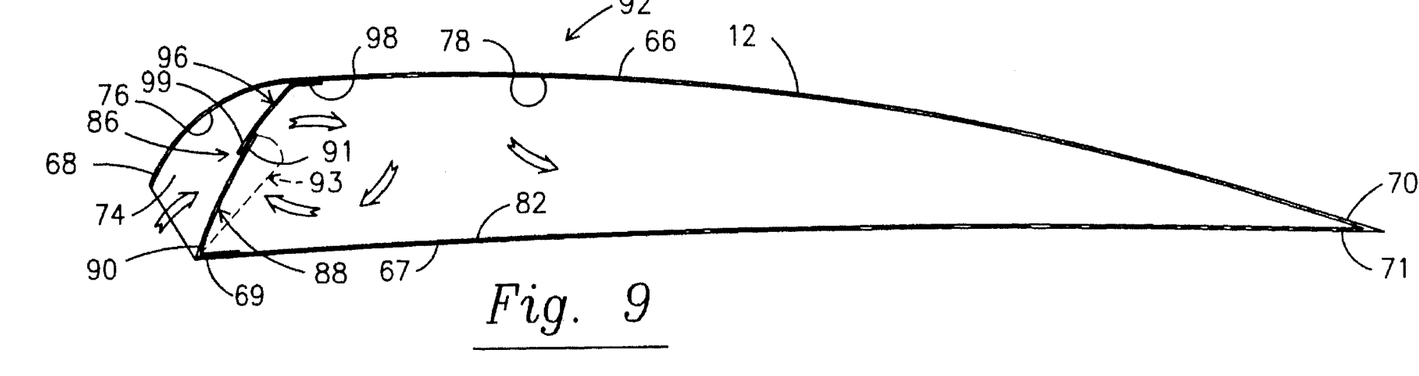
FIG. 9 is a side view of an alternative embodiment of a cell of the view of FIG. 2 having a valve that includes two elongated overlapping panels.
Figure 10:
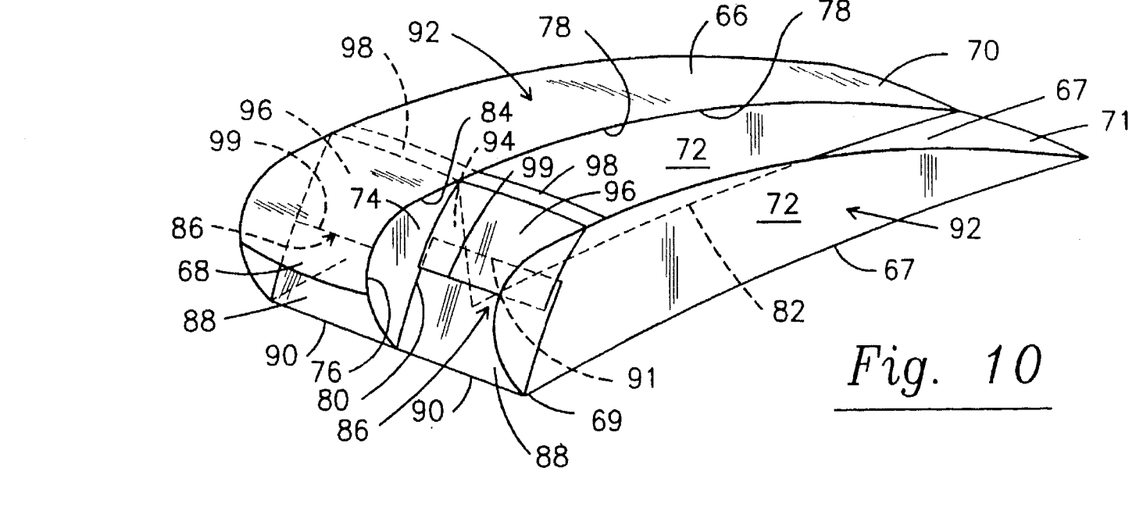
FIG. 10 is a perspective view of a pair of adjacent cells illustrating the embodiment of FIG. 9.

An alternative embodiment of the structure of FIG. 2 is illustrated in FIGS. 9 and 10, where the inflatable ram-air wing of the present invention similarly includes a top skin 66 and a bottom skin 67, with each respective skin including a front edge 68 and 69 and a rear edge 70 and 71, respectively. Each skin of this embodiment also includes a pair of generally opposed lateral edges extending between its respective front and rear edges. In FIG. 10, the top skin 66 of the right most cell has been removed to better illustrate the adjacent cells 92 of this preferred embodiment. The ram-air wing of this embodiment further includes a plurality of ribs, each of which includes a rear rib portion 72 and a front rib portion 74. Each rear rib portion 72 includes an upper edge 78 and a lower edge 82 and is spaced apart from each adjacent rear rib portion 72 at predetermined intervals. In addition, each rear rib portion 72 is positioned in the air-wing with at least a portion of the upper edge 78 affixed to the top skin 66, and at least a portion of the lower edge 82 affixed to the bottom skin 67. Each front rib portion 74 includes a front edge 76, at least a portion of which may be curved, positioned proximal the front edge 68 of the top skin 66 and the front edge 69 of the bottom skin 67. Each front rib portion 74 also includes a rear edge 80 and preferably is aligned substantially coplanar with and may be spaced apart from a respective rear rib portion 72. In addition, at least a portion of the front edge 76 is affixed to the top skin 66 and a portion of at least one of the front edge 76 and the rear edge 80 is affixed to the bottom skin 67, preferably positioned proximal the front edge 69.

Rather than have a single panel of flexible material for each valve as in the embodiments of FIGS. 2–8, the alternative embodiment illustrated in FIG. 9 and 10 employs a pair of elongated valve panels of a flexible material, which may suitably be zero permeability rip stop nylon, positioned proximal the front edges of the top and bottom skins 66 and 67, respectively, such that the valve 86 of each cell 78 is generally defined by the portion of these panels extending intermediate the adjacent front rib portions 74. The air wing, thus, includes an elongated bottom valve panel 88 of a flexible material having a bottom edge 90 affixed proximal and substantially parallel to the front edge 69 of the bottom skin 67. Also included is an elongated top valve panel 96 of a like flexible material having a top edge 98 affixed proximal and substantially parallel to the front edge 68 of the top skin 66 and spaced a predetermined distance from the front edge 68 of the top skin 66. Each elongated panel may run the length of a plurality of cells or suitably the entire length of front edge the air wing 10. The top valve panel 96 also includes a bottom edge 99 spaced apart a predetermined distance from the top edge 98. Preferably, at least a portion of the rear edge 80 of each front rib portion 74 is affixed to the top valve panel 96 between the top and bottom edges 98 and 99, respectively. Likewise, at least a portion of the rear edge 80 of each front rib portion 74 is affixed to the bottom valve panel 88 between the top and bottom edges 91 and 90, respectively.

The plurality of rib portions 72 and 74, the top skin 66 and the bottom skin 67 define a plurality of cells 92. Each cell 92 is defined by a pair of adjacent ribs, including the respective front and rear portions 74 and 72, respectively, of the adjacent ribs, the top skin 66 and the bottom skin 67 extending between the adjacent ribs.

As with the other embodiments of the present invention, at least one valve 86 is positioned within each of the plurality of the cells 92, with each valve 86 of FIGS. 9 and 10 defined by the portions of the top elongated valve panel 96 and the bottom elongated valve panel 88 affixed intermediate each pair of adjacent front rib portions 74. In addition, at least one of the top edge 91 of the bottom valve panel 88 and the bottom edge 99 of the top valve panel 96 is moveable between a position proximal the respective adjacent valve panel and a position away from the respective adjacent panel. Thus, the moveable edge of the top and bottom valve panels 96 and 88, respectively, may be urged proximal the respective adjacent panel when the air pressure inside the cell 92 is greater than the air pressure outside the cell 92 and be deflected away from the respective adjacent panel when the air pressure outside the cell 92 is greater than the air pressure inside the cell 92.

Similar to the other embodiments described above, a chamber 95 is preferably formed at the front portion of each cell 92. Each cell 92 also preferably includes an inlet 75 through which air enters the cell 92 that is defined by the front edge of the top skin 68, the front edge of the bottom skin 69 and the front edges 76 of adjacent front rib portion 74. The air enters the cell 92 through the inlet 75. The chamber 95 is generally defined by the inlet 75, the valve panels 88 and 96 positioned between a pair of adjacent front rib portions 74, the pair of adjacent front rib portions 74 and the portion of the top skin 78 forward of the attachment between the top edge 98 of the top panel 96. A substantial portion of the chamber 95 is preferably maintained regardless of the pressure deferential inside and outside the cell 92, thereby forming an air scoop to facilitate the inflation of the cells 92.

Each valve 86 positioned between an adjacent pair of suspension lines may also include a suitable cross-brace, such as the reinforcing tape described with respect to FIG. 13. In addition, the weave of the flexible material that comprises the top and bottom valve panels 96 and 86, respectively, may be aligned substantially normal with respect to the top and bottom edges of a respective top or bottom valve panel 96 or 88. It will be understood, however, that the respective top and bottom valve panels 96 and 88, respectively, may accordingly be positioned such that the respective weave pattern of each valve panel is aligned on a bias, preferably about 45°, between the respective adjacent ribs to which each respective valve panel 96 and 88 is affixed. Additionally, each adjacent rib may be spaced apart such that the weave pattern extends from the bottom edge of each loaded rib to the top edge of each adjacent non-loaded rib.

Similar in purpose to the other embodiments described herein, the top and bottom panels 96 and 88, respectively, of each non-return valve 86, cooperate to inhibit deflation and promote inflation of the cell 92. Thus, by positioning such elongated top and bottom valve panels within a plurality, although preferably all, the cells of the air wing, the valves 86 of each cell 92 may further increase the overall structural rigidity of the inflated air wing.

In the preferred embodiment illustrated in FIGS. 9 and 10, the rear rib portion 72 may be spaced apart rearwardly from each respective front rib portion 74 defining a cross port 94 between adjacent cells 92 or it may suitably be affixed to the top and bottom elongated valve panels 96 and 88, respectively, with an appropriate cross port positioned through the rear rib portion 72 proximal the valve panels. In addition, the distance between the top edge 91 and the bottom edge 90 is shown in FIGS. 9 and 10 to be less than the distance between top edge 98 and bottom edge 99. In this construction, the top edge 91 of the bottom panel 86 will tend to have a greater amount of movement than the bottom edge 99 of the top panel 96, generally indicated as dotted line 93 in FIG. 9. It will be understood that each of the top and bottom valve panels 96 and 88, respectively, of this preferred embodiment may be moveable such that they are both urged toward and away from each other based on the relative air pressure inside and outside the respective cells 92. The remaining components of the inflatable air wing of this embodiment are substantially the same as described with respect to FIG. 2.

Figure 11:
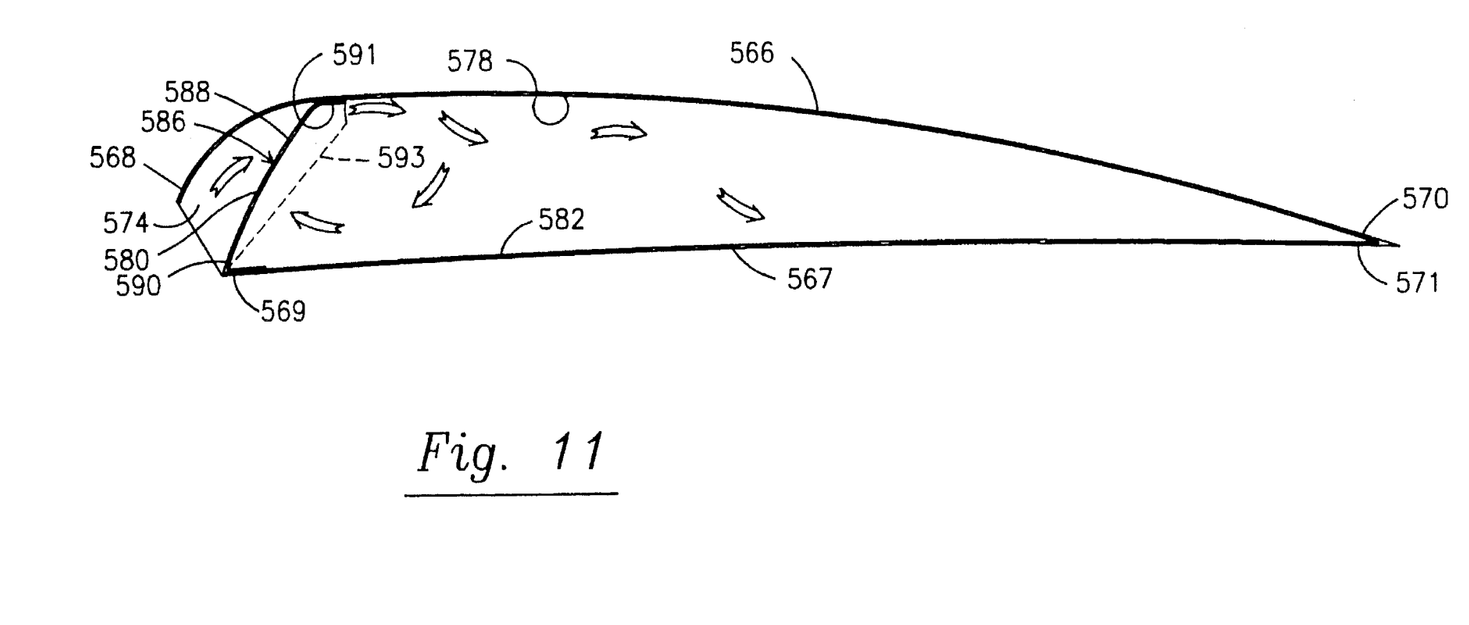
FIG. 11 is a side view of an alternative embodiment of a cell of the view of FIG. 1 having a valve that includes an elongated panel.

Another alternative embodiment of the cell of FIG. 9 is illustrated in FIG. 11, with similar reference numbers, increased by a factor of 500 indicating corresponding components. In this embodiment, the valve 586 of each cell includes a single elongated valve panel 588 of a flexible material having a top edge 591 preferably positioned adjacent the top skin 566 and a bottom edge 590 positioned adjacent the bottom skin 567 proximal and substantially parallel to the front edge 569 of the bottom skin 567. In order to accommodate the elongated valve panel 588, the air wing of this embodiment includes front and rear rib portions 574 and 572, respectively, substantially the same as described with respect to FIGS. 9 and 10. In this construction, at least a portion of the rear edge 580 of each of the front rib portions is preferably affixed to the elongated valve panel 588 such that each valve 586 of each cell is defined by the portion of the elongated panel 588 positioned intermediate each respective pair of adjacent front rib portions 576. The top edge 591 of each panel 588 is moveable preferably into sealing engagement with the top skin 566 and to a position away from the top skin 566, generally indicated by dotted line 593. In this manner, the valve 586 operates as a non-return valve allowing air to flow into the cell 592 but resisting the flow of air out of the cell 592.

In addition, the elongated bottom panel 588 may be integral with the bottom skin 567 and positioned proximal the top skin 566. This construction may be achieved such as, for example, by folding a front portion of the bottom skin 567 rearwardly towards the top skin 566, and affixing at least a part of the folded portion of the bottom skin 567 to the rear edge 580 of each front rib portion 574. In this manner a front portion of the bottom skin 567 is the panel 588, with the top edge 591 of this panel being moveable in each cell 592 between positions proximal and distal the top skin 566 according to the relative pressure inside and outside the cell. The remaining portions of the cell of this alternative embodiment are substantially identical to those described with respect to FIGS. 9 and 10.

Numerous variations and modifications of the present invention, all within the scope of this invention will readily occur to those skilled in the art. Such modifications may include, without limitation, the shape and positioning of each rib, the size and location of cross ports, the materials used and methods of affixing components together, among other variations. All such modifications and variations are considered to be fully within the scope of this invention. Accordingly, the foregoing detailed description is to be considered illustrative only of the principles of this invention and not to be limiting thereof. The scope of this invention is to be determined solely by the claims appended hereto.

What is claimed is:

1. A ram-air inflatable wing comprising:

a top skin having a front edge, a rear edge and a pair of generally opposed lateral edges;

a bottom skin having a front edge, a rear edge and a pair of generally opposed lateral edges;

a plurality of elongated ribs, each having an upper edge, a lower edge and a front edge, each pair of adjacent said ribs being spaced apart a predetermined distance, with at least a portion of said upper edge being affixed to said top skin and at least a portion of said lower edge being affixed to said bottom skin;

a plurality of elongated cells, each cell defined by said top skin, said bottom skin, and a pair of adjacent said ribs, each said cell having an inlet defined by said front edge of said top skin, said front edge of said bottom skin and said front edge of a pair of adjacent said ribs;

at least one first valve positioned within at least one of said plurality of cells, each said first valve comprising a panel of flexible material having a bottom edge positioned adjacent said bottom skin, a top edge positioned adjacent said top skin and a pair of generally opposed side edges spaced apart from one another a distance at least generally equal to the distance between said adjacent ribs with at least a portion of each of said pair of side edges being affixed to a respective one of said pair of adjacent ribs, at least one of said top edge and said bottom edge being moveable such that said moveable edge of the panel may be urged into generally sealing engagement with the respective adjacent said skin at a point substantially rearwardly of said front edge of said adjacent skin when the air pressure inside said cell is greater than the air pressure outside said cell and may be urged away from the respective adjacent said skin when the air pressure outside said cell is greater than the air pressure inside said cell, whereby each cell having a valve remains substantially inflated when the air pressure inside the cell is greater than the air pressure outside the cell inhibiting deformation of the air wing; and a chamber having a volume defined by said first valve, a pair of adjacent ribs forward of said first valve, said top skin positioned between said pair of said adjacent ribs forward of said engagement point and said inlet, such that a substantial part of said volume is maintained when said moveable edge engages the respective said adjacent skin.

2. The inflatable ram-air wing as in claim 1 wherein at least one said first valve is positioned within each pair of adjacent said cells.

3. The inflatable ram-air wing as in claim 2 wherein at least one first valve is positioned within each said cell.

4. The inflatable ram-air wing as in claim 1 further comprising a plurality of suspension lines attached to said lower edge of a plurality of said ribs, with at least two said cells positioned between an adjacent pair of said suspension lines.

5. The inflatable ram-air wing as in claim 4 wherein at least one said first valve is positioned within each of said two cells.

6. The inflatable ram-air wing as in claim 5 wherein said panel of flexible material of each of said first valves includes a weave pattern aligned on a bias with respect to each adjacent rib to which each said panel is affixed.

7. The inflatable ram-air wing as in claim 6, wherein said bias of said weave pattern of said flexible material is at about a forty-five degree angle with respect to each adjacent said rib to which said panel is affixed.

8. The inflatable ram-air wing as in claim 6, wherein said weave pattern of each said panel is aligned substantially normal to said top edge and said bottom edge of said panel of flexible material.

9. The inflatable ram-air wing as in claim 8 further comprising a cross-brace affixed to each said panel of flexible material, said cross-brace positioned on a bias between said top edge and said bottom edge of a respective said panel flexible material.

10. The inflatable ram-air wing as in claim 9 wherein each said cross-brace extends from a position proximal said attachment of an adjacent suspension line to a position proximal said upper edge of an adjacent rib.

11. The inflatable ram-air wing as in claim 6, wherein at least three cells are positioned between an adjacent pair of said suspension lines, said three cells including a middle cell and two respective cells positioned adjacent to said middle cell, with at least one said first valve positioned within each of said three cells.

12. The inflatable ram-air wing as in claim 11 wherein each of said three panels includes a weave pattern, with said weave pattern of said panel of said middle cell being aligned substantially normal to said top edge and said bottom edge of said middle panel.

13. The inflatable ram-air wing as in claim 12 wherein said weave pattern of each of said panels of said two cells positioned adjacent to said middle cell is aligned on a bias between each adjacent rib to which each respective said panel of said two is affixed.

14. The inflatable ram-air wing as in claim 13 wherein said bias of said weave pattern of said panels of said two cells adjacent to said middle cell is at about a forty-five degree angle with respect to each adjacent rib to which each respective said panel of said two cells is affixed.

15. The inflatable ram-air wing as in claim 14 wherein said bottom edge of each said panel is affixed to said bottom skin at a position proximal said front edge of said bottom skin.

16. The inflatable ram-air wing as in claim 15 wherein said top edge of said panel is moveable between a position of substantially sealing engagement with said top skin and a position away from said top skin.

17. The inflatable ram-air wing as in claim 16 wherein said top edge of said panel of said first valve is positioned adjacent said top skin and spaced a predetermined distance from said front edge of said top skin.

18. The inflatable ram-air wing as claimed in claim 17 wherein at least a portion of each of said pair of side edges of said panel extends in an arcuate manner in a direction rearwardly between said bottom edge and said top edge of said panel.

19. The inflatable ram-air wing as in claim 17 wherein each said cell further comprises a second valve positioned rearwardly of said first valve, said second valve comprising a panel of flexible material having a top edge a bottom edge and a pair of generally opposed side edges, said top edge of said panel of said second valve affixed to said top skin proximal said top edge of said panel of said first valve, at least a portion of each of said pair of side edges of said panel of said second valve affixed to a respective rib of said pair of adjacent ribs, and said bottom edge of said second panel positioned proximal said bottom skin and being moveable between a position proximal said bottom skin and a position away from said bottom skin.

20. The inflatable ram-air wing as claimed in claim 1 wherein said panel of each said first valve of each said cell is integral with said bottom skin.

21. The inflatable ram-air wing as in claim 1 wherein each said cell having a valve further comprises a plurality of adjacent valves, with a second said valve positioned within said cell rearwardly from a first said valve, each said adjacent valve comprising a panel of flexible material having a top edge positioned adjacent said top skin, a bottom edge positioned adjacent said bottom skin, and a pair of generally opposed side edges spaced apart a distance generally equal to the distance between said adjacent ribs, at least one of said top edge and said bottom edge of each said panel being moveable into sealing engagement with the respective adjacent said skin and to a position distal the respective adjacent said skin.

22. The inflatable ram-air wing as in claim 1 wherein each of said plurality of ribs further includes a curved front edge disposed between said upper edge and said lower edge of each said rib and positioned proximal said front edge of both said top skin and said bottom skin.

23. The inflatable ram-air wing as in claim 22 wherein the distance between said upper edge and said lower edge of each said rib is greatest proximal said front edge of said rib, with said distance between said upper and lower edges of said rib decreasing toward said rear edge of both said top and bottom skins.

24. The inflatable ram-air wing as in claim 23 wherein said front edge of said top skin extends over arid is affixed to at least a portion of said curved front edge of each of said ribs.

25. The inflatable ram-air wing as in claim 1 further comprising cross ports in said ribs between respective adjacent said cells to permit air flow between adjacent said cells.

26. An inflatable ram-air wing as in claim 1 wherein each of said plurality of ribs further comprises a front rib portion having a front edge positioned proximal and extending between said front edge of said top skin and said front edge of said bottom skin and a rear edge generally opposing said front edge and extending between a position proximal said front edge of said top skin and said front edge of said bottom skin, with at least a portion of said front edge of said front rib portion affixed to said top skin and at least a portion of one of said rear edge and said front edge of said front rib portion affixed to said bottom skin; and a rear rib portion aligned substantially coplanar with and spaced apart from a respective said front rib portion and having an upper edge and a lower edge, with at least a portion of said upper edge affixed to said top skin distal the front edge thereof and at least a portion of said lower edge affixed to said bottom skin distal the front edge thereof.

27. An inflatable ram-air wing as in claim 26 further comprising:

an elongated bottom panel of flexible material having a top edge positioned intermediate said top skin and said bottom skin and a bottom edge positioned adjacent said bottom skin and substantially parallel to said front edge of said bottom skin, at least a portion of said rear edge of each of said front rib portions affixed to said bottom panel, each said valve of said plurality of adjacent said cells being defined by the portion of said bottom panel intermediate each respective pair of adjacent said front rib portions, such that said top edge of said bottom panel intermediate each respective pair of adjacent said front rib portions is moveable.

28. An inflatable ram-air wing as in claim 27 wherein said top edge of said elongated bottom panel is positioned adjacent said top skin and is moveable between a position adjacent said top skin and a position away from said top skin.

29. The ram-air wing as claimed in claim 27 further comprising:

an elongated top panel of flexible material having a top edge affixed proximal and substantially parallel to said front edge of said top skin and a bottom edge positioned adjacent said top edge of said bottom panel, with at least a portion of said top panel overlapping at least a portion of said bottom panel, at least a portion of said rear edge of each of said front rib portions affixed to said top panel, each said valve of said plurality of cells being defined by the portions of said top panel and of said bottom panel affixed intermediate each pair of adjacent said front rib portions, such that at least one of said top edge of said bottom panel and said bottom edge of said top panel is moveable between a position proximal the respective adjacent said top or bottom panel and a position away from the respective adjacent said top or bottom panel, whereby the top edge of the moveable panel is urged proximal the respective adjacent panel when the air pressure inside the cell is greater than the air pressure outside the cell and is deflected away from the respective adjacent panel when the air pressure outside the cell is greater than inside the cell.

30. An inflatable ram-air wing having a front end and a rear end, said ram-air wing comprising:

a top skin having a front edge, a rear edge and a pair of generally opposed lateral edges;

a bottom skin having a front edge, a rear edge and a pair of generally opposed lateral edges;

a plurality of ribs, each said rib comprising a rear rib portion having an upper edge and a lower edge and being spaced apart from each adjacent rear rib portion at predetermined intervals with at least a portion of said upper edge of said rear rib portion affixed to said top skin and at least a portion of said lower edge of said rear rib portion affixed to said bottom skin, and a front rib portion having a front edge positioned proximal said front edge of said top skin and said front edge of said bottom skin and a rear edge positioned distal said front edge of said front rib portion, with at least a portion of said front edge of said front rib portion affixed to said top skin and at least a portion of one of said front edge and said rear edge of said front rib portion affixed to said bottom skin;

an elongated top panel of flexible material having a top edge affixed proximal and substantially parallel to said front edge of said top skin and a bottom edge spaced apart from said top edge, at least a portion of said rear edge of each of said front rib portion affixed to said top panel between said top edge and said bottom edge of said top panel;

an elongated bottom panel of flexible material having a top edge positioned adjacent said bottom edge of said top panel and a bottom edge spaced apart from said top edge and affixed proximal and substantially parallel to said front edge of said bottom skin, at least a portion of said rear edge of each of said front rib portion affixed to said bottom panel between said top edge and said bottom edge of said bottom panel;

a plurality of cells, each said cell defined by said top skin, said bottom skin, a pair of adjacent said rear rib portions and the pair of adjacent front rib portions aligned substantially coplanar with said pair of adjacent rear rib portion; and at least one valve positioned within each of a plurality of said cells, said one valve comprising said top panel and said bottom panel affixed intermediate each pair of adjacent said front rib portions such that at least one of said top edge of said bottom panel and said bottom edge of said top panel is moveable between a position proximal the respective adjacent said panel and a position away from the respective adjacent said panel, whereby the moveable edge of the top and bottom panel of each cell may be urged proximal the respective adjacent panel when the air pressure inside the cell is greater than the air pressure outside the cell inhibiting deformation of the air wing by restricting air flow out of the cell, and may be deflected away from the respective adjacent panel when the pressure outside the cell is greater than inside the cell enhancing the formation of the air wing by allowing additional air flow into the cell.

31. The ram-air wing as in claim 30 wherein each of said rear rib portions are generally coplanar with and spaced apart rearwardly from each of said respective front rib portions, defining cross ports between adjacent said cells.

32. The ram-air wing as in claim 30 wherein said distance between said top edge and said bottom edge of said top panel is less than the distance between said top edge and said bottom edge of said bottom panel.

* * * * *

UNITED STATES PATENT AND TRADEMARK OFFICE
CERTIFICATE OF CORRECTION

PATENT NO. : 5,573,207
DATED      : November 12, 1996
INVENTOR(S) : Germain

It is certified that error appears in the above-indentified patent and that said Letters Patent is hereby corrected as shown below:

Claim 9, column 12, line 15 after "panel" insert --of--.

Claim 13, column 12, line 35 after "two" insert --cells--.

Claim 24, column 13, line 31 change "arid" to "and".

Claim 30, column 15, line 10 change "portion" to "portions".

Signed and Sealed this

Fourth Day of March, 1997

*Attest:*

BRUCE LEHMAN

*Attesting Officer*     *Commissioner of Patents and Trademarks*